Figure 1:
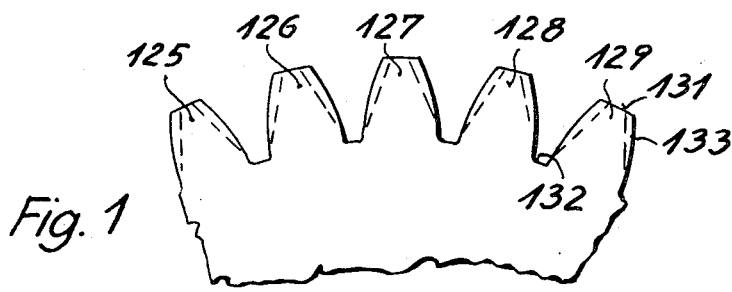

United States Patent [19]

Loos

[11] 3,733,886
[45] May 22, 1973

[54] TOOTHED TOOL FOR WORKING OF GEARS
[75] Inventor: Herbert Loos, Munich, Germany
[73] Assignee: Carl Hurth Maschinen-und Zahnradfabrik, Munich, Germany
[22] Filed: Mar. 4, 1971
[21] Appl. No.: 120,991

[30] Foreign Application Priority Data

Mar. 7, 1970 Germany............P 20 10 963.1

[52] U.S. Cl................................72/469, 29/159.2
[51] Int. Cl. ................................B21d 17/00
[58] Field of Search...............72/469, 123, 102, 72/108; 29/121 R, 159.2 R

[56] References Cited

UNITED STATES PATENTS 2,062,927  12/1936  Peterson..........................29/159.2

Primary Examiner—Charles W. Lanham
Assistant Examiner—R. M. Rogers
Attorney—Woodhams, Blanchard & Flynn

[57] ABSTRACT

A toothed tool for the roll-working of toothed workpieces. There is provided a toothed tool having spaced serrations along the length of a tooth, said serrations extending from the dedendum to the addendum of the tool teeth whereby said serrations define a plurality of spaced ribs on the tool teeth. Said serrations are arranged in such a manner that the ribs are off-set on one tooth with respect to the corresponding ribs on an adjacent tooth. The relative width and spacing of the serrations and ribs are such that the sum of widths of the ribs on one tooth flank is equal to the sum of the width of ribs on all, or at least most, of the other tool flanks facing in the same direction.

4 Claims, 2 Drawing Figures

PATENTED MAY 22 1973　　3,733,886

Inventor:
HERBERT LOOS
BY
Woodhams, Blanchard & Flynn
ATTORNEYS

TOOTHED TOOL FOR WORKING OF GEARS

The invention relates to a toothed tool for the working of gears by rolling, which tool is provided with serrations extending from the addendum to the dedendum with ribs for forming the workpiece tooth flanks being adjacent and defined by said serrations.

The invention relates to both gearlike and also racklike tools, either of which may be either straight or helically toothed.

In the chipless working with a tool, as described above, ripple-shaped markings can show on the workpiece tooth flanks. The height of the ripples is, depending on the tooth pitch and contact force, 0.001 to 0.002 mm. (0.0004 to 0.0008 inch.). These ripples can, to a lesser extent, also occur during gear shaving. The purpose of the invention is to avoid or at least to reduce the ripples on the tooth surface.

I have found that the ripples are due to variations which exist in the surface pressure of the ribs which result in variations in the deformation of the workpiece surface during rolling.

The basic purpose of the invention is attained by causing the sum of the widths of the ribs in the longitudinal direction of the teeth to be the same (equal) on each of at least the majority of the tooth flanks facing toward the same side (left or right).

An optimum effect in this respect is obtained if the ribs on all tool tooth flanks directed toward the same side are the same (equal); however, the ripples are at least somewhat reduced if the ribs are the same on the majority of the teeth.

A still better effect is obtained by an embodiment of the invention in which the sum of the widths of the ribs is the same at least on the majority of the flanks of both sides (left and right) of the teeth.

Further characteristics and advantages of the invention will be apparent from the following description.

The invention is set forth in connection with FIGS. 1 and 2.

Figure 2:
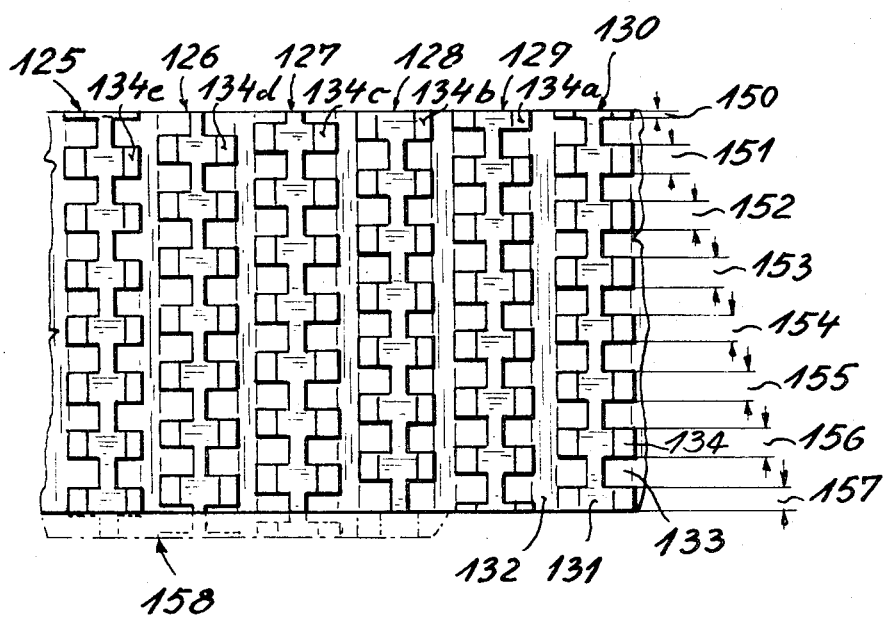

FIG. 1 is a side view of a fragmentary portion of a tool according to the invention, FIG. 2 illustrates in an unwound manner a top view of the teeth of a tool made according to the invention.

FIG. 1 illustrates five teeth 125 to 129 of a gearlike tool, the tooth dedendum of which are provided with a plurality of serrations 133 extending from the tooth addendum 131 to the tooth dedendum 132 (FIG. 2 shows one more tooth 130 than FIG. 1 having serrations 133 and ribs 134). The workpiece material is compressed on the tooth surface by means of said ribs which are arranged offset or staggered on the successive teeth, as clearly illustrated by reference numerals 134a to 134e. The sum of the widths 150 to 157 of the ribs forms the tool tooth flank acting onto the respective workpiece tooth flank. Workpiece and work tool are urged against one another with a force as desired.

In describing the tool, no attention has so far been paid to the fact that the sum of the ribs can change due to the staggering. On the lower side of FIG. 2, the tool of the invention has been extended by means of dash-dotted lines to illustrate a tool in which the invention has not been applied. For example the tooth 128 of this extended illustration has 8 full ribs per tooth side, while the tooth 126 has only little more than 7 ribs. Thus, the tooth 128 acts at a given total contact force between the tool and workpiece with a smaller unit pressure onto the workpiece than, for example, the tooth 126. Thus, the tooth 128 deforms the workpiece material less than the tooth 126. However, if the tool is constructed in such a manner that at all times the same number of ribs acts onto the workpiece surface, as is illustrated by the part of FIG. 2 which is shown in solid lines (compare for example the teeth 128 and 126), then all tool teeth produce the same surface pressures and equally deform the workpiece material.

The desired effect is more closely attained the more evenly the surface pressure is applied. The optimum effect is achieved when all tooth flanks of the tool apply the same surface pressure. As fewer teeth are provided with the same total rib widths, the desirable result diminishes.

While the principles of the invention may be obtained by any selection of the serration and/or rib widths which is otherwise acceptable from the general standpoint of tool designing practice, in the embodiment of the invention illustrated in the drawings, the equal rib surface on successive teeth is obtained by first causing the widths of said serrations on the tooth flank facing at least in one selected direction to be equal to each other and the spacing of said serrations on said teeth flanks to be equal to each other and then by causing the width of the tool to be multiple of the total of the width of one serration and the spacing between adjacent serrations. In other words, the combined width of one rib and one adjacent serration (such as rib 134 and serration 133 in FIG. 2), thereby defining a mutually adjacent pairing, is equal to the fraction of $1/N$ in relationship to the width of said tool where N equals the total number of mutually adjacent pairings across the tooth of the toothed tool and thereby equal to the width of said toothed tool.

The embodiments of the invention in which an exclusive property or privilege is claimed are defined as follows:

1. In a toothed tool for working of gears by rolling which is provided with serrations extending from addendum to dedendum, ribs forming the tool tooth flanks being adjacent and defined by said serrations and being arranged offset with respect to one another on the successive teeth, the improvement comprising the sum of the widths of the ribs in axial direction on one circumferentially facing side of a tool tooth equals the sum of the widths of the ribs on the same circumferentially facing side of at least the majority of the other teeth of the tool.

2. A toothed tool according to claim 1, wherein the sum of the widths of the ribs in axial direction of the teeth on said one circumferentially facing side equals the sum of the widths of the ribs on both circumferentially facing sides of at least the majority of the other teeth of the tool.

3. A toothed tool according to claim 1, wherein the width of each of said ribs is equal.

4. A toothed tool according to claim 1, wherein the combined width of one of said ribs and one adjacent serrations thereby defining a mutually adjacent pairing is equal to the fraction of $1/N$ in relationship to the width of said tool where N equals the total number of mutually adjacent pairings axially across the tooth of said toothed tool and thereby the width of said tool.

* * * * *